United States Patent
Lehner

(10) Patent No.: US 8,184,418 B2
(45) Date of Patent: May 22, 2012

(54) MOTOR VEHICLE CONTROL DEVICE FOR REGULATING THE PRESSURE OF THE VOLUMETRIC FLOW OF A MOTOR VEHICLE HYDRAULIC APPARATUS AND ASSOCIATED PRESSURE REGULATION METHOD

(75) Inventor: Oliver Lehner, Beratzhausen (DE)

(73) Assignee: Continental Automotive GmbH, Hannover (DE)

( * ) Notice: Subject to any disclaimer, the term of this patent is extended or adjusted under 35 U.S.C. 154(b) by 794 days.

(21) Appl. No.: 12/302,654

(22) PCT Filed: Jan. 11, 2007

(86) PCT No.: PCT/EP2007/050251
§ 371 (c)(1),
(2), (4) Date: Nov. 26, 2008

(87) PCT Pub. No.: WO2007/137877
PCT Pub. Date: Dec. 6, 2007

(65) Prior Publication Data
US 2009/0188250 A1 Jul. 30, 2009

(30) Foreign Application Priority Data
May 26, 2006 (DE) .......................... 10 2006 024 708

(51) Int. Cl.
*H02H 7/00* (2006.01)
(52) U.S. Cl. ..................................................... 361/93.1
(58) Field of Classification Search ................. 361/93.1, 361/160
See application file for complete search history.

(56) References Cited

U.S. PATENT DOCUMENTS

| 6,730,001 | B1 | 5/2004 | Vohmann et al. |
| 7,209,009 | B2 * | 4/2007 | Steinbach et al. ............... 331/16 |
| 7,596,442 | B2 * | 9/2009 | Aigner et al. ................... 701/42 |

(Continued)

FOREIGN PATENT DOCUMENTS

DE 4217138 A1 4/1994

(Continued)

OTHER PUBLICATIONS

Hodel et al.: "Variable-Structure PID Control to Prevent Integrator Windup" IEEE Transactions on Industrial Electronics, vol. 48, No. 2, Apr. 2001, IEEE Service Center Piscataway, NJ, XP 011023799, ISSN: 0278-0046.

(Continued)

*Primary Examiner* — Stephen W Jackson
(74) *Attorney, Agent, or Firm* — Laurence A. Greenberg; Werner H. Stemer; Ralph E. Locher

(57) ABSTRACT

A motor vehicle control device with a digital control loop has an actuator of an electrical actuator device in order to regulate the pressure of the volumetric flow of a motor vehicle hydraulic apparatus. A current limiting unit is provided in the forward path of the digital control loop between the digital controller of the latter and the actuator of the electrical actuator device. The current limiting unit, in order to protect the components of the electrical actuator device, limits the manipulated variable signal from the digital control loop if a predefined permissible current threshold value is exceeded in the electrical actuator device. The digital controller has an additional limiting unit which essentially limits the I component of its manipulated variable signal from the time at which the current limiting unit is activated.

16 Claims, 1 Drawing Sheet

U.S. PATENT DOCUMENTS

2001/0028195 A1    10/2001    Yu

FOREIGN PATENT DOCUMENTS

| DE | 4322366 | A1 | 1/1995 |
| DE | 19624794 | A1 | 1/1998 |
| DE | 19952351 | A1 | 5/2001 |
| DE | 1118517 | A1 | 7/2001 |
| DE | 10101678 | A1 | 7/2002 |
| WO | 9502211 | A1 | 1/1995 |

OTHER PUBLICATIONS

German Office Action dated Mar. 7, 2007.
International Search Report dated May 4, 2007.

* cited by examiner

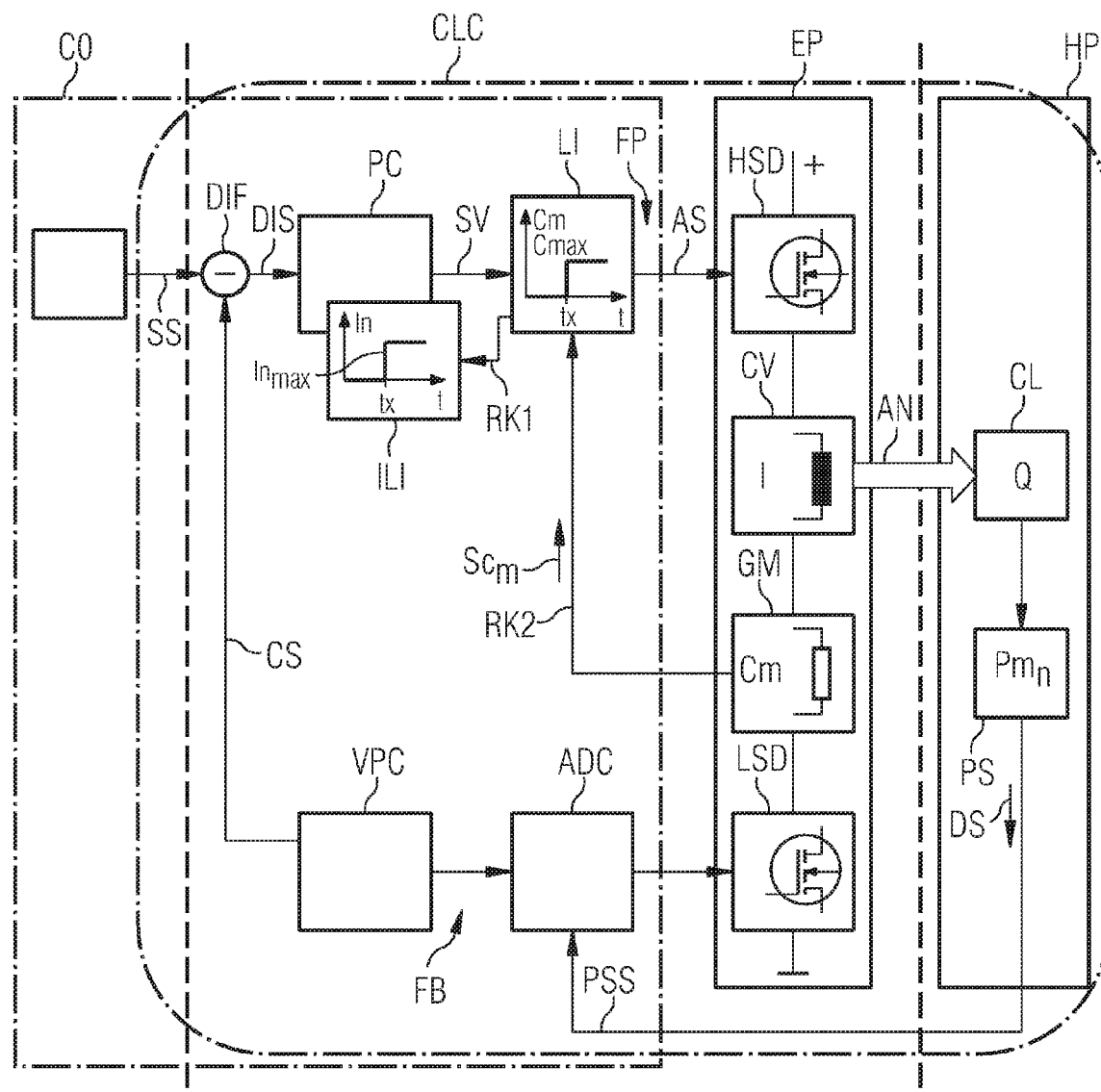

MOTOR VEHICLE CONTROL DEVICE FOR REGULATING THE PRESSURE OF THE VOLUMETRIC FLOW OF A MOTOR VEHICLE HYDRAULIC APPARATUS AND ASSOCIATED PRESSURE REGULATION METHOD

BACKGROUND OF THE INVENTION

Field of the Invention

The invention relates to a motor vehicle control device with a digital control loop for regulating the pressure of the volumetric flow of a motor vehicle hydraulic apparatus by means of an actuator of an electrical actuator facility, with a current limiting unit being provided in the forward path of the digital control loop between the latter's digital regulator and the actuator of its electrical actuator facility, which current limiting unit limits the manipulated variable signal of the digital control loop to protect the components of the electrical actuator facility, if a predefined, permissible current threshold value is exceeded in the electrical actuator facility.

With automatic transmissions in motor vehicles for example various clutch and/or brake mechanisms operating as hydraulic apparatuses are actuated hydraulically for gear selection and to implement switching changes. In particular hydraulically actuated clutch and/or brake mechanisms are used in motor vehicles to couple or secure shafts. Hydraulic actuation here takes place in such a manner that the throughflow and therefore the hydraulic pressure of the hydraulic medium in the respective clutch and/or brake mechanism is set by a so-called control magnet valve with the aid of an assigned digital control loop. The feedthrough of the respective control magnet valve is a function of the electric coil current flowing through the valve and is regulated by a current regulator. The pressure of the hydraulic medium in the respective hydraulic apparatus is hereby set in particular by a so-called PID regulator operating as the pressure regulator, which directly activates the output stages of the respective control magnet valve by way of a so-called PWM (pulse-width modulated) signal, thereby regulating the electric current flowing through the control magnet valve.

In practice damage can be caused to the electrical components of the electrical actuator facility of such a control loop, which has a control magnet valve as its actuator, if the electric current flowing through the electrical components of this electrical actuator facility is too great. To protect the electrical components of the electrical actuator facility until now a power limiting unit has been connected in the forward path of the control loop between the latter's digital regulator and the actuator of the actuator facility, to limit the manipulated variable signal of the digital control loop, if a predefined, permissible current threshold is exceeded. Hitherto a fixed current threshold value has been used for current limiting purposes and a fixed threshold value of the integral component of the digital regulator has been used to limit the latter's integral component. This fixed limit for the integral component is generally too high. This results in dead time for the digital control loop, when the electric current for the actuator of the electrical actuator facility is to depart from the fixed limit again, in other words is to lie below the current threshold value, as only then does the digital regulator clear the integral part of its output manipulated variable signal. This dead time is unwanted and can cause problems with switching changes. This becomes even more critical, the more exacting the requirements become for the speed of the switching changes of a transmission and/or brake mechanism.

SUMMARY OF THE INVENTION

The object of the invention is to provide a motor vehicle control device, which allows pressure regulation of the volumetric flow of the motor vehicle hydraulic apparatus with the least delay possible by means of an actuator of an electrical actuator facility whilst at the same time complying with a predefined, permissible current threshold value to protect the components of the electrical actuator facility. According to the invention this object is achieved for a motor vehicle control device of the type mentioned in the introduction in that the digital regulator has an additional limiting unit, which limits the I component of its manipulated variable signal essentially from the time of activation of the current limiting unit.

Because the I component or integral component of the manipulated variable signal of the digital regulator is limited, as soon as the current limiting unit has been activated, the integral component of the manipulated variable signal cannot continue to grow beyond a maximum value. This largely avoids an impermissible long dead time for the digital regulator after departing from the limit for the manipulated variable signal of the current limiting unit. A fast-response pressure regulation of the volumetric flow in the motor vehicle hydraulic apparatus is thus possible.

The invention also relates to a method for regulating the pressure of the volumetric flow of a motor vehicle hydraulic apparatus by means of an actuator of an electrical actuator facility of a digital control loop, with the manipulated variable signal of the digital control loop being limited by a current limiting unit in the forward path of the digital control loop between the latter's digital regulator and the actuator of its electrical actuator facility to protect the components of the electrical actuator facility, if a predefined, permissible current threshold value is exceeded in the electrical actuator facility, being characterized in that an additional limiting unit of the digital regulator limits the I component of its manipulated variable signal essentially from the time of activation of the current limiting unit.

Other developments of the invention are set out in the subclaims.

The invention and its developments are described in more detail below with reference to a single FIGURE.

BRIEF DESCRIPTION OF THE DRAWING

The FIGURE is a schematic diagram of a motor vehicle control device in the form of an exemplary transmission controller.

DESCRIPTION OF THE INVENTION

The FIGURE shows a schematic diagram of a transmission controller CO by way of example as a motor vehicle control device. Its main components are shown in the FIGURE by a rectangular frame with a dot-dash line. It serves to set the volumetric flow Q of a hydraulic medium, in particular of a hydraulic fluid, such as hydraulic oil for example, in a motor vehicle hydraulic apparatus HP by means of the electrical actuator CV of an electrical actuator facility EP. The transmission controller CO is preferably configured as an automatic transmission control device for an automatic transmission. The electrical actuator facility EP has as its actuator a control magnet valve CV between its input-side, high-potential driver stage HSD and its low-potential driver stage LSD. The two driver stages can in particular be part of the transmission controller CO. Setting the coil current I of the control magnet valve CV causes the latter's armature AN in a control cylinder to be immersed to different depths in the volumetric flow Q of the hydraulic apparatus HP. To make the diagram simpler the armature AN is simply shown by an arrow in the FIGURE. In practice the hydraulic apparatus HP is formed by at least one clutch mechanism and/or by at least one hydraulic brake CL. The clutch mechanism or hydraulic brake CL is preferably connected actively to a transmission of the motor vehicle. This has been omitted here to simplify the diagram. A specific hydraulic pressure of the volumetric flow Q in the hydraulic apparatus HP is assigned to the coil current I of the control magnet valve CV by way of the latter's characteristics field.

To set the coil current I of the control magnet valve CV to a specific temporal setpoint current pattern as precisely and quickly as possible, in other words expressed in equivalent terms to generate a required temporal pressure pattern for the volumetric flow Q in the hydraulic apparatus HP corresponding to the coil current I, the transmission controller CO has a dynamic, digital regulator PC in the forward path FP of its digital control loop CLC. The digital regulator PC is configured in particular as a so-called PID regulator. It outputs a manipulated variable signal SV to a downstream current limiting unit LI. This current limiting unit LI is connected by way of a feedback path RK2 to a current measuring element GM, which is assigned to the control magnet valve CV in the electrical actuator facility EP. This current measuring element can in particular be an integral component of the transmission controller CO. It uses the timing of the digital control loop CLC to transmit measured current values $c_m$ of the electric coil current of the control magnet valve CV by means of the current measuring signal $Sc_m$ to the current limiting unit LI by way of the feedback path RK2. A maximum permissible current threshold value $c_{max}$, to which the coil current I of the control magnet valve CV is limited, is predefined for the current limiting unit LI, in case said coil current I exceeds this threshold value $c_{max}$. To this end the current limiting unit LI implements a corresponding capping or limiting of the manipulated variable signal SV at the output of the digital regulator PC. In the exemplary embodiment here the digital current regulator PC preferably changes the scan ratio of a PWM (pulse-width modulated) signal as the manipulated variable signal. For its part this uses the output stage driver HSD to time the supply voltage of the control magnet valve CV, thereby regulating the coil current I of the control magnet valve CV. The permissible current threshold value $c_{max}$ for the actual current of the control magnet valve CV is preferably determined in such a manner that damage to or other impermissible strains on the electrical components, in particular the control magnet valve CV of the electrical actuator facility EP, are in practice largely avoided. The current limiting unit LI thus outputs a modified manipulated variable signal AS, corresponding to the input-side manipulated variable signal SV, to the high-resistance output stage driver HSD, if the measured actual current $c_m$ is below the predefined, permissible current threshold value $c_{max}$. It outputs a modified manipulated variable signal AS, which is a specific factor less than the input-side manipulated variable signal SV, if the measured actual current $c_m$ of the control magnet valve CV exceeds the predefined, permissible current threshold value $c_{max}$. The reduction factor for the manipulated variable signal SV is therefore selected in this instance in such a manner that as a result the actual current I in the control magnet valve is limited to the maximum permissible current threshold value $c_{max}$.

The motor vehicle hydraulic apparatus HP is assigned a pressure sensor PS in the feedback path FB of the digital control loop CLC, said pressure sensor PS measuring the pressure $Pm_n$ of the volumetric flow Q in the motor vehicle hydraulic apparatus HP and outputting a pressure signal DS. The pressure signal DS is digitized with the aid of a subsequent A/D converter ADC in the feedback path FB. A downstream conversion unit VPC in the feedback path FB is used to convert the digitized voltage values of the pressure signal DS to corresponding pressure values and to determine from these a corresponding actual current value as the measured controlled variable CS based on stored characteristics fields of the control magnet valve CV and the hydraulic apparatus HP. These characteristics fields indicate the functional relationship between the respective coil current of the control magnet valve CV and the resulting pressure of the volumetric flow Q. The determined controlled variable CS is supplied to a difference forming unit or subtraction element DIF. This forms the difference between a predefined setpoint pressure signal SS supplied on the input side and the measured pressure signal CS. The subtraction element DIF outputs this difference as a control deviation signal DIS to the input of the PID regulator PC. The setpoint pressure signal SS is hereby represented by a setpoint current signal. The same applies to the measured control deviation CS.

The PID regulator PC now has an additional limiting unit ILI, which likewise limits the I component $I_n$ of its manipulated variable signal SV essentially from the time tx of activation of the current limiting unit LI. To this end the current limiting unit LI is connected to the digital PID regulator PC by way of a feedback path RK1. In the exemplary embodiment here the clock ratio of a PWM (pulse-width modulated) signal is used as the manipulated variable signal SV to set the coil current I of the actuator CV. This pulse-width modulated signal controls the high-resistance driver stage HSD in such a manner that a required coil current value of the actuator CV is set by the high-resistance driver stage HSD.

The PID regulator PC expediently outputs the manipulated variable signal SV to activate the actuator CV of the electrical actuator facility EP according to the following relationship:

$$\Theta = (P_n + I_n + D_n) \cdot s_\Theta$$

where $$P_n = p \cdot e_{c_n},$$

$$I_n = I_{n-1} + (i \cdot e_{c_n} \cdot \delta_n),$$

$$D_n = \frac{d \cdot (e_{c_n} - e_{c_{n-1}})}{\delta_n},$$

and $$e_{c_n} = p_{t_n} - p_{m_n},$$

where $e_{c_n}$ represents the difference (control deviation) between the setpoint pressure and measured pressure of the volumetric flow Q of the hydraulic apparatus HP,
$P_{t_n}$ represents the setpoint pressure for the volumetric flow Q of the hydraulic apparatus HP,
$P_{m_n}$ represents the measured pressure of the volumetric flow Q of the hydraulic apparatus,
p represents the P coefficient of the resulting proportional component $P_n$ of the manipulated variable signal SV,
i represents the I coefficient of the resulting integral component $I_n$ of the manipulated variable signal SV,
d represents the D coefficient of the resulting differential component of the manipulated variable signal SV, $P_n$ represents the resulting proportional component of the manipulated variable signal SV,
$I_n$ represents the resulting integral component of the manipulated variable signal SV,
$D_n$ represents the resulting D component of the manipulated variable signal SV,
$\delta_n$ represents the time between two regulator calls (regulator cycle time) of the PID regulator PC,
$\Theta$ represents the resulting scan ratio of the manipulated variable signal SV for driver activation (manipulated variable) of the actuator CV of the electrical actuator facility EP,
$s_\Theta$ represents a scaling factor, and
n represents the time clock of the digital PID regulator PC.

The manipulated variable signal SV of the digital PID regulator PC is advantageously limited with the aid of the current limiting unit LI according to the following relationship:

$$\Theta_{nmax} = \Theta_{n-1} \cdot \frac{c_{max}}{c_m} \cdot (1 + \gamma),$$

where
$\Theta_{n\ max}$ is the limited scan ratio of the manipulated variable signal SV,
$\Theta_{n-1}$ is the (limited) scan ratio in the preceding regulator cycle of the manipulated variable signal,
$c_m$ is the measured current of the actuator CV of the electrical actuator facility EP,
$c_{max}$ is the maximum permitted current of the actuator CV of the electrical actuator facility EP,
$\gamma$ is an additionally permitted amount over the current of the actuator CV, to equalize measurement errors (optional), and
n is the time clock of the digital PID regulator PC.

As soon as the current limiting unit LI responds at time tx when the measured coil current $c_m$ exceeds the current threshold value $c_{max}$, the digital PID regulator PC additionally limits the integral component $I_n$ of its manipulated variable signal SV advantageously according to the following relationship:

$$I_{nmax} = \frac{\Theta_{n-1}}{s_\Theta} \cdot \frac{c_{max}}{c_m} \cdot (1 + \gamma) \cdot (1 + \theta),$$

where
$I_{n\ max}$ is the maximum permitted I component of the manipulated variable signal SV,
$\Theta_{n-1}$ is the limited scan ratio of the manipulated variable signal SV in the preceding regulator cycle,
$c_m$ is the measured current of the actuator CV,
$c_{max}$ is the maximum permitted electric current of the actuator CV,
$\gamma$ is an additionally permitted amount over the current of the actuator CV, to equalize measurement errors (optional),
$\theta$ is a permitted increase in the I component, to allow regulation in the limit region,
$s_\Theta$ is a scaling factor and
n is the time clock of the digital PID regulator PC.

To summarize, the coil current through the control magnet valve is considered to be measured and the scan ratio of the pulse-width modulated manipulated variable signal to activate the input-side driver stage is considered to be limited in such a manner that the permitted valve current $c_{max}$ is not exceeded or is only exceeded by a defined factor. The integral component of the manipulated variable signal SV is additionally expediently limited in such a manner that the maximum current $c_{max}$ is still reached but the integral component does not continue to grow beyond it. In order also to be able to regulate in this region, it is advantageous to select the limit of the integral component so that it is rather higher, for example 5% above the pressure limit calculated from the current limit.

It is thus possible to limit the valve current of the control magnet valve precisely in respect of measurement accuracy. Since the limit, in other words the current threshold value $c_{max}$, can generally be interpreted roughly, the current measurement can likewise be interpreted roughly in a corresponding manner. It can thus be achieved more economically. The integral component is limited as a function of the measured coil current, i.e. the threshold value for limiting the integral component is as low as possible and as high as necessary. In other words, the limit of the I component of the manipulated variable signal of the digital regulator is limited dynamically through the feedback with the current limiting unit in the forward path of the digital control loop between the digital regulator and the actuator. Therefore adaptive limiting of the I component of the manipulated variable signal is provided as a function of downstream current limiting by the current limiting unit. This largely avoids unwanted dead time effects, which can result from too high an integral component. This allows fast temporal changes for transmissions, in particular automatic transmissions, largely with few delays, in other words with a fast response. In particular any remaining dead time effects remain below 10 msec as a result.

The invention claimed is:
1. A motor vehicle control device, comprising:
   a digital control loop for regulating a pressure of a volumetric flow of a motor vehicle hydraulic apparatus by means of an actuator of an electrical actuator unit;
   said digital control loop having a digital regulator and a current limiting unit connected in a forward path of the digital control loop, between said digital regulator and the electrical actuator unit of the actuator, said current limiting unit limiting a manipulated variable signal of said digital control loop to protect components of the electrical actuator unit, if a predefined, permissible current threshold value is exceeded in the electrical actuator unit; and
   said digital regulator having an additional limiting unit configured to limit an I component of the manipulated variable signal substantially from a time of activation of said current limiting unit.

2. The motor vehicle control device according to claim 1, wherein said current limiting unit is connected to said digital regulator by way of a feedback path, for limiting the I component of the manipulated variable signal.

3. The motor vehicle control device according to claim 1, wherein the motor vehicle hydraulic apparatus is assigned a pressure sensor connected in a feedback path of the digital control loop, said pressure sensor measuring the pressure of the volumetric flow in the motor vehicle hydraulic apparatus and outputting a controlled variable signal representing the pressure.

4. The motor vehicle control device according to claim 3, wherein an output of said pressure sensor is connected to a subtraction element at an input of said digital control loop, for generating a control deviation signal for said digital controller for a deviation between a predefined setpoint pressure signal supplied on an input side of said digital controller and the measured controlled variable signal of the pressure sensor.

5. The motor vehicle control device according to claim 1, wherein said current limiting unit is connected to a current measuring unit of the electrical actuator unit by way of a feedback path, and the feedback path is configured to transmit a measured electric current at the actuator with a current measuring signal.

6. The motor vehicle control device according to claim 1, wherein the actuator of the electrical actuator unit is an electromagnetic control magnet valve.

7. The motor vehicle control device according to claim 1, wherein said digital regulator has an output outputting a PWM signal, and a scan ratio of the PWM signal is used as the manipulated variable signal to set the actuator.

8. The motor vehicle control device according to claim 1, wherein said digital regulator is a PID controller.

9. The motor vehicle control device according to claim 8, wherein said PID controller is configured to output the manipulated variable signal to activate the actuator of the electrical actuator unit according to the following relationship:

$$\Theta = (P_n + I_n + D_n) \cdot s_\Theta$$

where $$P_n = p \cdot e_{c_n},$$

$$I_n = I_{n-1} + (i \cdot e_{c_n} \cdot \delta_n),$$

$$D_n = \frac{d \cdot (e_{c_n} - e_{c_{n-1}})}{\delta_n},$$

and $$e_{c_n} = p_{t_n} - p_{m_n},$$

wherein:
- $e_{c_n}$ a difference (control deviation) between a setpoint pressure and a measured pressure of the volumetric flow of the hydraulic apparatus;
- $p_{t_n}$ represents the setpoint pressure for the volumetric flow of the hydraulic apparatus;
- $p_{m_n}$ represents a measured pressure of the volumetric flow of the hydraulic apparatus;
- p represents a P coefficient of a resulting proportional component $P_n$ of the manipulated variable signal;
- i represents an I coefficient of a resulting integral component $I_n$ of the manipulated variable signal;
- d represents a D coefficient of a resulting differential component of the manipulated variable signal;
- $P_n$ represents the resulting proportional component of the manipulated variable signal (SV);
- $I_n$ represents the resulting integral component of the manipulated variable signal (SV);
- $D_n$ represents the resulting D component of the manipulated variable signal (SV),
- $\delta_n$ represents the time between two regulator calls (regulator cycle time) of the PID regulator;
- $\Theta$ represents the resulting scan ratio of the manipulated variable signal SV for driver activation (manipulated variable) of the actuator of the electrical actuator unit;
- $s_\Theta$ represents a scaling factor; and
- n represents a time clock of said PID controller.

10. The motor vehicle control device according to claim 9, wherein said current limiting unit is configured to limit the manipulated variable signal of said digital PID controller according to the following relationship:

$$\Theta_{nmax} = \Theta_{n-1} \cdot \frac{c_{max}}{c_m} \cdot (1 + \gamma),$$

wherein:
- $\Theta_{n\ max}$ is a limited scan ratio of the manipulated variable signal
- $\Theta_{n-1}$ is a (limited) scan ratio in a preceding controller cycle of the manipulated variable signal;
- $c_m$ is the measured current of the actuator of the electrical actuator unit;
- $c_{max}$ is the maximum permitted current of the actuator of the electrical actuator unit; and
- $\gamma$ is an additionally permitted amount over the current of the actuator, to equalize measurement errors (optional).

11. The motor vehicle control device according to claim 10, wherein said PID controller is configured to limit an integral component thereof on activation of said current limiting unit according to the following relationship:

$$I_{nmax} = \frac{\Theta_{n-1}}{s_\Theta} \cdot \frac{c_{max}}{c_m} \cdot (1 + \gamma) \cdot (1 + \theta)$$

where
- $I_{n\ max}$ is a maximum permitted I component of the manipulated variable signal; and
- $\theta$ is a permitted increase in the I component, to allow regulation in the limit region.

12. The motor vehicle control device according to claim 9, wherein said PID controller is configured to limit an integral component thereof on activation of said current limiting unit according to the following relationship:

$$I_{nmax} = \frac{\Theta_{n-1}}{s_\Theta} \cdot \frac{c_{max}}{c_m} \cdot (1 + \gamma) \cdot (1 + \theta)$$

where
- $I_{n\ max}$ is a maximum permitted I component of the manipulated variable signal;
- $\Theta_{n-1}$ is a limited scan ratio of the manipulated variable signal in a preceding controller cycle;
- $c_m$ is the measured current of the actuator;
- $c_{max}$ is a maximum permitted electric current of the actuator;
- $\gamma$ is an additionally permitted amount over the current of the actuator, to equalize measurement errors (optional); and
- $\theta$ is a permitted increase in the I component, to allow regulation in the limit region.

13. The motor vehicle control device according to claim 8, wherein said current limiting unit is configured to limit the manipulated variable signal of said digital PID controller according to the following relationship:

$$\Theta_{nmax} = \Theta_{n-1} \cdot \frac{c_{max}}{c_m} \cdot (1 + \gamma),$$

wherein:
- $\Theta_{n\ max}$ is a limited scan ratio of the manipulated variable signal
- $\Theta_{n-1}$ is a (limited) scan ratio in a preceding controller cycle of the manipulated variable signal;
- $c_m$ is the measured current of the actuator of the electrical actuator unit;
- $c_{max}$ is the maximum permitted current of the actuator of the electrical actuator unit;
- $\gamma$ is an additionally permitted amount over the current of the actuator, to equalize measurement errors (optional); and
- n is a time clock of the digital PID controller.

14. The motor vehicle control device according to claim 8, wherein said PID controller is configured to limit an integral component thereof on activation of said current limiting unit according to the following relationship:

$$I_{nmax} = \frac{\Theta_{n-1}}{s_\Theta} \cdot \frac{c_{max}}{c_m} \cdot (1+\gamma) \cdot (1+\theta)$$

where
- $I_{n\,max}$ is a maximum permitted I component of the manipulated variable signal;
- $\Theta_{n-1}$ is a limited scan ratio of the manipulated variable signal in a preceding controller cycle;
- $c_m$ is the measured current of the actuator;
- $c_{max}$ is a maximum permitted electric current of the actuator;
- $\gamma$ is an additionally permitted amount over the current of the actuator, to equalize measurement errors (optional);
- $\theta$ is a permitted increase in the I component, to allow regulation in the limit region;
- $s_\Theta$ is a scaling factor; and
- n is a time clock of the digital PID controller.

15. A closed-loop pressure control method for controlling a pressure of a volumetric flow in a motor vehicle hydraulic apparatus by way of an actuator of an electrical actuator unit in a digital control loop, the method which comprises:

limiting a manipulated variable signal of the digital control loop with a current limiting unit connected in a forward path of the digital control loop between a digital regulator thereof and the actuator, to thereby protect components of the electrical actuator unit, if a predefined, permissible current threshold value is exceeded in the electrical actuator unit; and limiting an I component of the manipulated variable signal with an additional limiting unit of the digital regulator substantially from a time of activation of the current limiting unit.

16. A closed-loop pressure control method for controlling a pressure of a volumetric flow in a motor vehicle hydraulic apparatus by way of an actuator of an electrical actuator unit in a digital control loop, the method which comprises:

providing a control device according to claim 1;

limiting a manipulated variable signal of the digital control loop with the current limiting unit of the control device, to thereby protect components of the electrical actuator unit, if a predefined, permissible current threshold value is exceeded in the electrical actuator unit; and limiting an I component of the manipulated variable signal with the additional limiting unit of the control device substantially from a time of activation of the current limiting unit.

\* \* \* \* \*